(12) United States Patent
Diks

(10) Patent No.: US 11,450,046 B1
(45) Date of Patent: Sep. 20, 2022

(54) DIGITAL GRAPHICS UPLOADING, DIALOGUING, AND COMMENTING SYSTEM AND METHOD OF USE OF THE SAME

(71) Applicant: Bartel Diks, Chatsworth, CA (US)

(72) Inventor: Bartel Diks, Chatsworth, CA (US)

( * ) Notice: Subject to any disclaimer, the term of this patent is extended or adjusted under 35 U.S.C. 154(b) by 107 days.

(21) Appl. No.: 16/864,197

(22) Filed: May 1, 2020

Related U.S. Application Data

(60) Provisional application No. 62/844,420, filed on May 7, 2019.

(51) Int. Cl.
| | | |
|---|---|---|
| *G06T 11/60* | (2006.01) |
| *G06Q 20/06* | (2012.01) |
| *G06F 3/04845* | (2022.01) |
| *G06F 16/538* | (2019.01) |

(52) U.S. Cl.
CPC .......... *G06T 11/60* (2013.01); *G06F 3/04845* (2013.01); *G06F 16/538* (2019.01); *G06Q 20/065* (2013.01)

(58) Field of Classification Search
CPC .... G06T 11/60; G06F 3/04845; G06F 16/538; G06Q 20/065
See application file for complete search history.

(56) References Cited

U.S. PATENT DOCUMENTS

| | | | |
|---|---|---|---|
| 6,069,622 A | 5/2000 | Kurlander | |
| 6,232,966 B1 | 5/2001 | Kurlander | |
| 8,429,523 B2 | 4/2013 | Tobita | |
| 8,621,366 B1 | 12/2013 | Sampath | |
| 8,838,728 B2 * | 9/2014 | Kosonen | G06F 16/9577 709/217 |
| 8,952,985 B2 | 2/2015 | Nonaka | |
| 2008/0039163 A1 | 2/2008 | Eronen et al. | |
| 2010/0110080 A1 | 5/2010 | Goodlinson | |
| 2011/0138271 A1 | 6/2011 | Tobita | |
| 2013/0100161 A1 | 4/2013 | Nonaka | |
| 2013/0104014 A1 * | 4/2013 | Nonaka | G06F 40/174 715/201 |
| 2013/0283157 A1 * | 10/2013 | Ebata | G06T 11/60 715/265 |
| 2014/0132633 A1 * | 5/2014 | Fekete | G06Q 50/01 345/634 |

(Continued)

*Primary Examiner* — YuJang Tswei
(74) *Attorney, Agent, or Firm* — John Rizvi; John Rizvi PA—The Patent Professor®

(57) ABSTRACT

A digital graphics uploading, dialoguing, and commenting system is disclosed. The digital graphics uploading, dialoguing, and commenting system may provide a social forum upon which various artists may present their work for the purpose of soliciting diverse commentary by enabling other users to add their own dialogue or express their own comments on the existing dialogue. Unique to the system may be the ability to enable a user to search the database of digital media files using various parameters, such as keywords or categories, as assigned by the artist or editor, for viewing or further editing. In this way, a user may apply their own perspectives or interpretations to the available digital media, to express a position or opinion to a wider audience of potential viewers. Moreover, the present system allows business owners to initiate tasks for other users to engage, and compensate those users for their work.

12 Claims, 10 Drawing Sheets

(56) References Cited

U.S. PATENT DOCUMENTS

2015/0254727 A1* 9/2015 Papageorgiou ........ G16H 10/60
  705/3
2018/0019984 A1* 1/2018 Isaacson ................ G06Q 50/01

\* cited by examiner

DIGITAL GRAPHICS UPLOADING, DIALOGUING, AND COMMENTING SYSTEM AND METHOD OF USE OF THE SAME

CROSS-REFERENCE TO RELATED APPLICATIONS

This application claims the benefit of U.S. Provisional Patent Application Ser. No. 62/844,420, filed on May 7, 2019, which is incorporated herein in its entirety.

FIELD OF THE INVENTION

The present invention relates generally to social networking software, and more particularly, to a digital graphics uploading, dialoguing, and commenting system.

BACKGROUND OF THE INVENTION

Storytelling is an ancient and valuable form of human expression, through which stories or narratives may be shared as a means of entertainment, education, cultural preservation, or for the passing of mores and beliefs. Storytelling is known to predate writing, and the earliest forms of storytelling were usually oral stories combined with gestures and expressions retold, embellished, and improvised over time. The advent of writing and the use of stable and portable media allowed stories to be recorded more permanently, and to be transcribed accurately into various languages or for various cultures.

Storytelling may be divided up into a significant number of categories and purposes. A fairy tale, for example, may be a short story featuring magical or fantasy characters or entities and may contain only superficial references to religion. A legend, on the other hand, may be a narrative featuring human actions believed to have taken place in history, and upon which moral values and religious teachings may be based. Mythology, by contrast, may include a body of narratives or stories that play a central role in the society to which they are associated, such as establishing the roles of gods, demigods, and supernatural beings.

Modern storytelling often takes place on media in the form of, for example, televised shows, printed articles, streamed movies, or digital imagery. Comics, one medium used to express ideas by a combination of images and text, frequently take the form of a series of images comprising speech balloons or captions for narration and storytelling. Comics may be made available in the form of comic books or comic strips, depending on the length of the story to be told, with comic books becoming increasingly common in the late twentieth century, and webcomics becoming widely used in the twenty-first century.

Comic strips, specifically, are a series of images usually telling their entire short story in one or two lines of images. From the twentieth century through to the present day comic strips have been regularly featured in newspapers and magazines, and such strips have become increasingly popular for use on the internet. Such comic strips may relate their stories to fictional characters and may contain a series of humorous episodes, or may comprise one-off satires or images containing some political or social commentary.

Such comic strips, though, generally relate the story that their author intended to an intended audience, with the artist of the images and the author of the text either being the same individual or being two or more individuals collaborating to convey a particular story. Meanwhile, the advent of the internet has connected users, especially those with varying ideologies and perspectives, in ways previously unknown to humans, and the story that a particular author may wish to tell may not be relevant or appropriate for those users in different locales or, even, nations. Thus, when a single author or a series of authors with a singular objective prepare a comic strip, or any story, for that matter, for posting on the internet, the subject or lesson of their storytelling may not be relevant to a wide spectrum of their potential audience.

One potential solution to such a limitation is for artists to collaborate with writers of varying ideologies and purposes to create imagery and stories that are relevant to other groups of individuals. Such a solution, though, is still limited in its application, as the writer may still only prepare a story relevant to persons sharing their same perspectives. The result, then, would only be to displace the original problem, which is that the appropriate audience is shifted to a different group, but that new group is still the only appropriate audience for the particular story.

Therefore, there is a need in the art for a digital graphics uploading, dialoguing, and commenting system that allows a single story panel to be made relevant to a broad spectrum of potential viewers.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments or examples of the present disclosure, a digital graphics uploading, dialoguing, and commenting system, comprising:

a digital platform stored in a computer-readable storage media, a plurality of digital based subsystems in electrical communication with the computer-readable storage media, which when executed by one or more processors on one or more servers, causes the digital graphics uploading, dialoguing, and commenting system to:

process user subscription inquiries from at least one person using at least one electronic device requesting access to the digital platform, when subscribing the person capable of choosing at least one user type from a plurality of user types supported by the digital platform to become a registered user;

grant the registered user authorization and access to at least one digital media subsystem from the plurality of digital based subsystems supported by the digital platform;

present at least one digital image that is editable, viewable and searchable to a plurality of users subscribed to the digital platform, wherein the digital image is editable, viewable, and searchable on an electronic device, and wherein only a portion of the editable digital image is editable;

process input commands from the registered user using a second digital based subsystem to edit the portion of the digital image to create a non-editable digital image;

initiate an identifiable marker subsystem that assigns at least one identifiable marker to the at least one digital image and the non-editable digital image; and present the non-editable digital image to the plurality of users subscribed to the digital platform.

In one aspect, the digital graphics uploading, dialoguing, and commenting system may comprise a proprietary software.

In one aspect, the digital graphics uploading, dialoguing, and commenting system may comprise a proprietary hardware.

In another aspect, the digital graphics uploading, dialoguing, and commenting system may comprise a central database.

In another aspect, the digital graphics uploading, dialoguing, and commenting system may comprise a cloud-based application program interface.

In another aspect, the digital graphics uploading, dialoguing, and commenting system may comprise a mobile, desktop, and/or laptop computer application software.

In another aspect, the digital graphics uploading, dialoguing, and commenting system may comprise a plurality of user types.

In another aspect, the digital graphics uploading, dialoguing, and commenting system may comprise a social media platform.

In another aspect, the digital graphics uploading, dialoguing, and commenting system may comprise a text input system.

In another aspect, the digital graphics uploading, dialoguing, and commenting system may comprise a publishing system.

In another aspect, the digital graphics uploading, dialoguing, and commenting system may comprise a feedback system.

In another aspect, the digital graphics uploading, dialoguing, and commenting system may interact with existing social media services.

In another aspect, the digital graphics uploading, dialoguing, and commenting system may interact with existing internet search engines.

In another aspect, the digital graphics uploading, dialoguing, and commenting system may comprise digital security protocols.

In another aspect, the digital graphics uploading, dialoguing, and commenting system may comprise a user information dataset.

In another aspect, the digital graphics uploading, dialoguing, and commenting system may comprise voice recognition technology.

In another aspect, the digital graphics uploading, dialoguing, and commenting system may comprise geolocating technology.

In another aspect, the digital graphics uploading, dialoguing, and commenting system may comprise machine learning technology.

In another aspect, the digital graphics uploading, dialoguing, and commenting system may comprise language processing technology.

In another aspect, the digital graphics uploading, dialoguing, and commenting system may comprise a payment system.

In another aspect, the digital graphics uploading, dialoguing, and commenting system may comprise a digital wallet system.

In another aspect, the digital graphics uploading, dialoguing, and commenting system may be compatible with existing digital wallet systems.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

Figure 1:
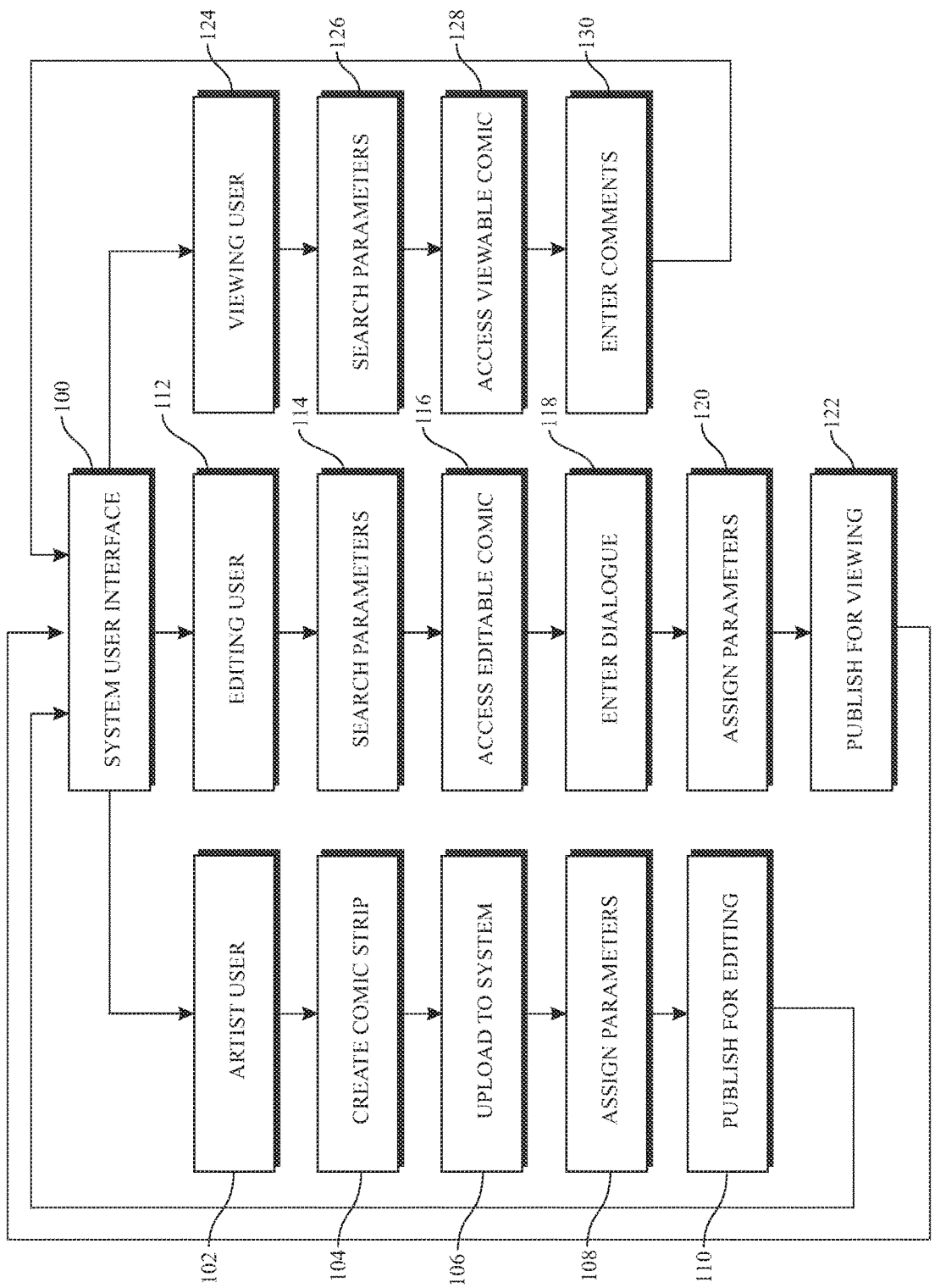
FIG. 1 schematically presents an overview of a digital graphics uploading, dialoguing, and commenting system, in accordance with aspects of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The digital graphics uploading, dialoguing, and commenting system may provide a social forum upon which various artists may present their work for the purpose of soliciting diverse commentary by enabling other users to add their own dialogue or express their own comments on the existing dialogue. Unique to the system may be the ability to enable a user to search the database of digital media files using various parameters, such as keywords or categories, as assigned by the artist or editor, for viewing or further editing. In this way, a user may apply their own perspectives or interpretations to the available digital media, so as to express a position or opinion to a wider audience of potential viewers.

The illustrations of FIGS. 1-8 illustrate a first embodiment of a digital graphics uploading, dialoguing, and commenting system. The system may comprise, generally, a proprietary software, having a user interface on a computer, an electronic device, such as a mobile device, or a proprietary hardware, and which may be used to publish digital media files for editing and commenting by other users. The system is intended to broaden the applicability of such digital media files by allowing users of different backgrounds, intentions, and belief systems to edit those files such that they are appropriate to various target demographics. The system may comprise a plurality of user types, and may further associate a plurality of user settings with each of such user types.

To begin using the system a user may access the proprietary software by downloading it to a computer or mobile device 300, and may then log into the system via the system user interface 100. The log in process may involve the user selecting a unique user name and password and selecting a user type. The user types may include, for example, artist users 102, editing users 112, viewing users 124, or any other appropriate types.

The user interface 100 of the proprietary software may vary in available selections based on the user type selected. In one exemplary embodiment, the proprietary software may be downloadable from a cloud services system communicable with a computer or mobile device through a wired or wireless connection. The cloud service may comprise one or more servers, computers, I/O and/or network interfaces, processors, memory, and necessary computer readable medium for storing, processing, operating, sharing, transferring, and receiving, data, files, videos, images, audio, and other information, and for performing computations, hosting web pages and/or applications, maintaining and communicating with databases, processing software application source cloud, and other operatives associated with software functionalities. In one exemplary embodiment, the one or more cloud-based servers may include an application server, a web server, a computing server, a communication server, a database or file server, a mail server, proxy server, or additional servers.

The cloud-based server can be managed, controlled and operated by a designated internet service provider, dedicated management, or third party. As such the server may be managed by any of an application service provider (ASP) offering on-demand software or software as a service, a network service provider (NSP), an internet service provider (ISP), a managed service provider (MSP), or a telecommunication service provider (TSP) where providers can charge an ongoing subscription or fixed fee service to users. The server memory may comprise any suitable memory technology, such as static random access memory (SRAM), synchronous dynamic RAM (SDRAM), nonvolatile/flash-type memory, or any other type of memory. Machine-executable program instructions or computer application programs associated with the augmented reality software platform may be stored on one or more machine readable mediums, including but not limited to, optical disk, magnetic or optical card or tape, flash memory, CD/DVD-ROM, memory dongle, magnetic storage media such as a hard drive or any other external machine-readable medium coupled to server or server computer via, I/O interface. Computer-accessible medium may include any volatile or non-volatile media such as RAM (e.g. SDRAM, DDR SDRAM, RDRAM, SRAM, etc.), ROM, EEPROM, or EPROM.

With reference to FIG. 1, and by way of example, an artist user 102 may log into the system user interface 100 and set their user type as an artist, and may then be given access to an artist user interface. The artist user interface may allow the artist user 102 to manage the digital media files that they have created for use with the system. Such management may include uploading, editing, and deleting of such digital media files, and may further include altering the metadata parameters associated with the digital media files. Such metadata parameters may include any appropriate search parameters such as, for example, genre, culture, gender, political, religious, humor, number of characters, and number of images in the digital media file.

Once the artist user 102 has logged into the system interface 100, the artist user 102 may create a comic strip 104, or other digital media file, within the system. Such creation of the file may comprise establishing information relating to the file, such as a title and other background information, and uploading a digital media file 106 from the user's computing device to the system's central database, or may comprise creating the imagery of the digital media file within the system itself. After the digital media file has been created 104 and uploaded 106, the artist user 102 may assign the various metadata parameters 108 that they wish appropriate to the file. Through this process, the artist user 102 has created a unique digital media entity within the system comprising identifiable information, a digital image, and a variety of searchable parameters. The artist user 102 may then publish the digital media file for editing 110.

By way of a second example, an editing user 112 may log into the system user interface 100 and set their user type as an editor, and may then be given access to an editing user interface. The editing user interface may allow the editing user 112 to search through various published digital media files based on search parameters, and may also allow the editing user 112 to manage the digital media files that are editable within the system. Such management may include editing and deleting of such digital media files, and may further include altering the metadata parameters associated with the digital media files.

Once the editing user 112 has logged into the system interface 100, the editing user 112 may use search parameters 114 to find various published digital media files 110. Once the editing user 112 has selected a digital media file, they may access that file 116 for editing. Such editing may include adding dialogue 118 and captions to the digital image, but may not include altering of the digital image in other ways. After the digital media file has had dialogue added 118, the editing user 112 may assign various additional metadata parameters 120 that they wish appropriate to the file. Through this process the editing user 112 has created a second unique digital media entity within the system comprising identifying information, a digital image, and a variety of searchable parameters. The editing user 112 may then publish the digital media file for viewing 122 and feedback.

By way of a third example, a viewing user 124 may log into the system user interface 100 and set their user type as a viewer, and may then be given access to a viewer user interface. The viewer user interface may allow the viewing user 124 to search through various published digital media files based on search parameters and to comment on or rate such digital media files within the user interface 100 feedback system.

Once the viewing user 124 has logged into the system interface 100, the viewing user 124 may use search parameters 126 to find various digital media files published for editing 110 or for viewing 122. Once the viewing user 124 has selected a digital media file, they may access that file 116 for viewing. Such viewing may include accessing the digital media file and viewing the digital imagery or reading the dialogue of the imagery, where available. The viewing user 124 may then add commentary and apply a rating score to the digital media file, though may not edit the imagery or the dialogue in any way. Through this process the viewing user 124 has only commented on unique digital media entities within the system, but has not created a new entity within the system.

As contemplated by the present disclosure, certain user types may further comprise features and abilities of other user types. By way of example, an artist user 102 may also have the abilities of an editing user 112 and viewing user 124 within the system. An editing user 112 may only have the additional abilities of a viewing user 124. A viewing user 124 may be limited to only those abilities of their user type.

The proprietary software may further comprise a bar code or similar scannable system to permit a user to share metadata parameters or digital media files among users. By way of example, an artist user 102 or editing user 112 may set up a scannable code related to a particular digital media file, which may be shared across other digital or physical platforms, and which may then be scanned by users so that they may directly access the digital media file. In this way, the artist user 102 may solicit or advertise the availability for editing of their digital media file, or an editing user 112 may advertise for commenting or rating their viewable digital media file.

Inputs to the system user interface may be made by any appropriate means such as, for example, text-based input or voice-based input. In an embodiment comprising text-based input, the user may type queries and commands into the user interface using any appropriate input source, such as a physical or virtual keyboard or a smartphone or tablet device connected to the system, whether physically or wirelessly. In an embodiment comprising voice-based input the user may interact with the system using a microphone, whether individually or integrated into an electronic device, such as a smartphone or tablet device, and the system may comprise speech recognition and language interpretation components to understand and interpret the input.

Central to the application of speech recognition and language interpretation is the application of a natural language to structured commands convertor, which may be based on applying existing natural language processing concepts, to the user interface. Current natural language processors work by applying lemmatization and tokenization concepts to language inputs to extract the entities and intent of the given instruction. This process involves the analyzing of input terms and the analyzing of used syntax and inflection to determine blocks of entities in the input, and then converting those entities and intents into relevant structured commands. The present system may receive a natural language input from the user and automatically generate the appropriate command line instruction or sequence of command line instructions for the user interface.

In more detail, the system implements domain knowledge with natural language processing to achieve the desired results. Domain knowledge, as contemplated by the present disclosure, may include the user command sequences, configurations, and constraints relevant to the system. The natural language processor of the system converts the entities and intents of the user's input into the command-line instructions of the present system to manage digital file metadata, commands, and requests by applying such domain knowledge.

Figure 2:
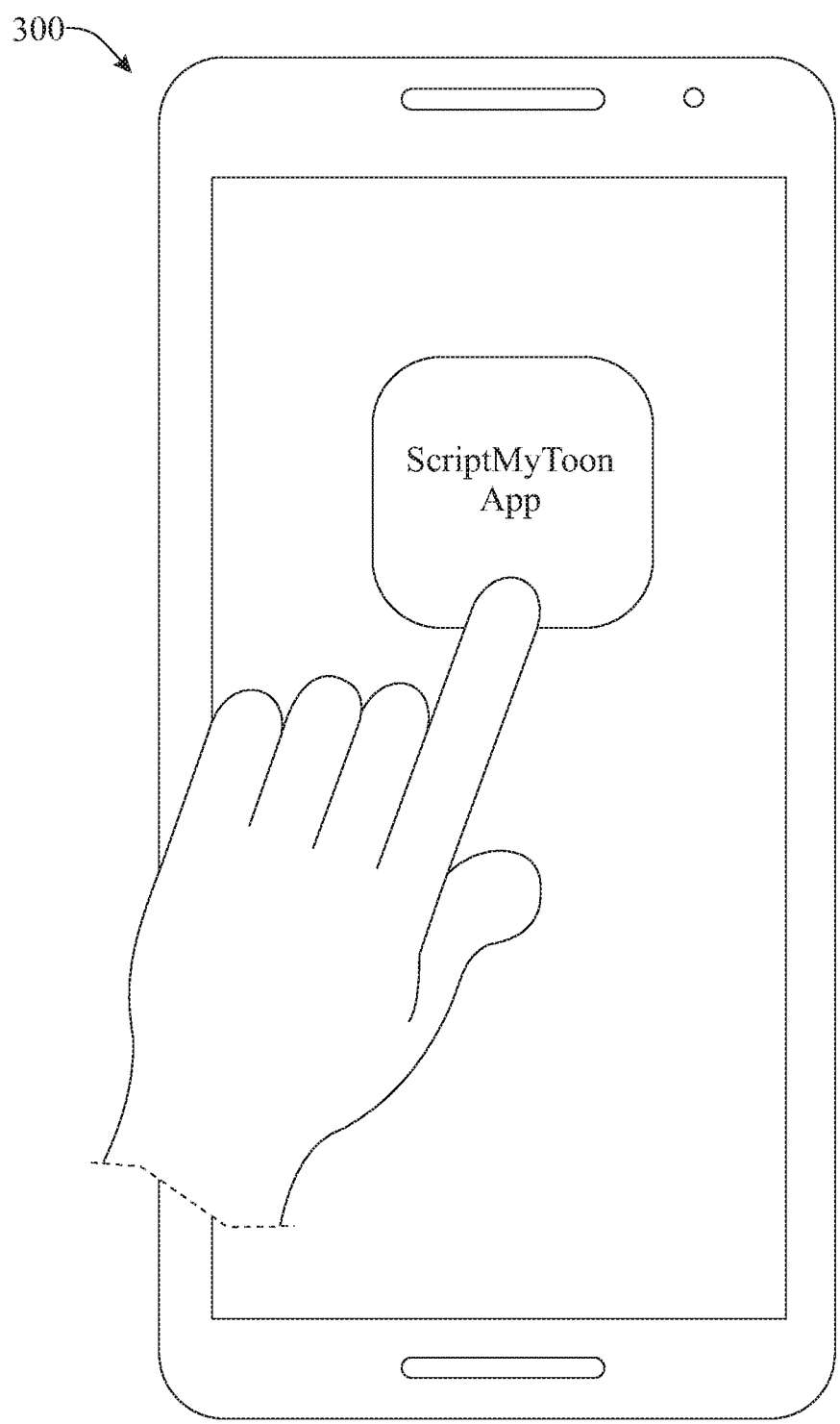
FIG. 2 illustrates a splash screen of an exemplary user interface of a digital graphics uploading, dialoguing, and commenting system, in accordance with aspects of the present disclosure.
Figure 3:
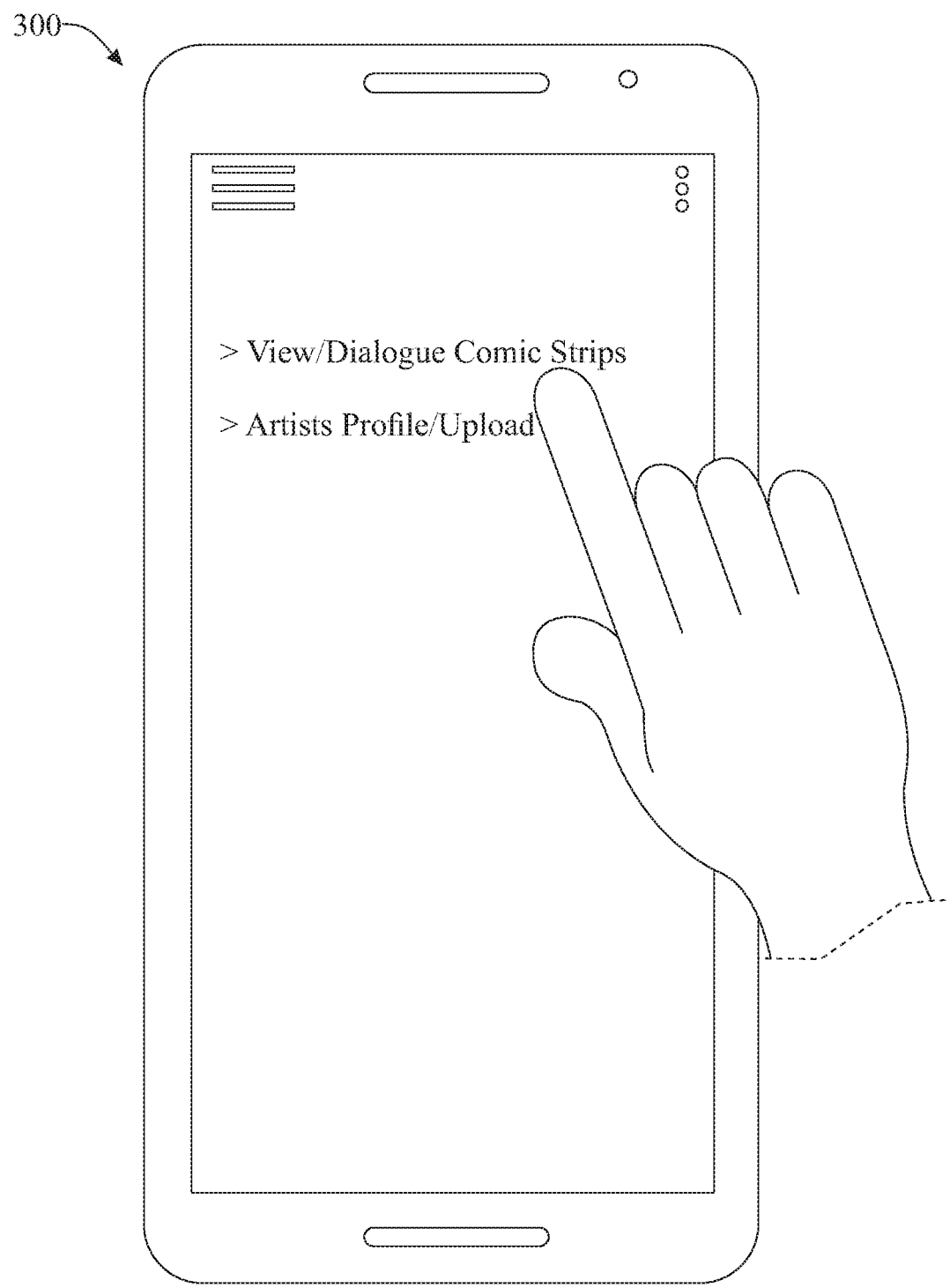
FIG. 3 illustrates a first menu screen of an exemplary user interface of a digital graphics uploading, dialoguing, and commenting system, in accordance with aspects of the present disclosure.
Figure 4:
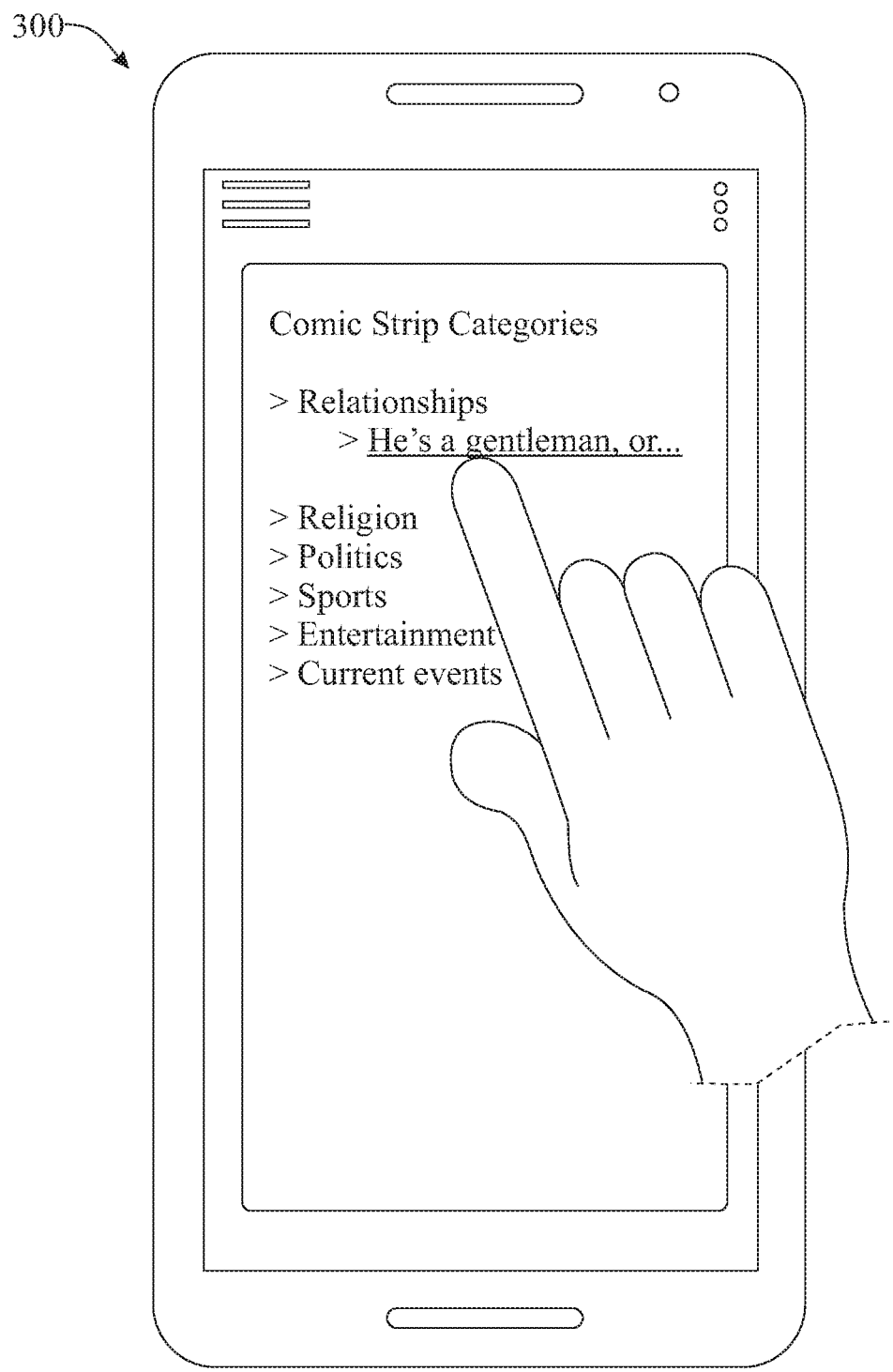
FIG. 4 illustrates a second menu screen of an exemplary user interface of a digital graphics uploading, dialoguing, and commenting system, in accordance with aspects of the present disclosure.
Figure 5:
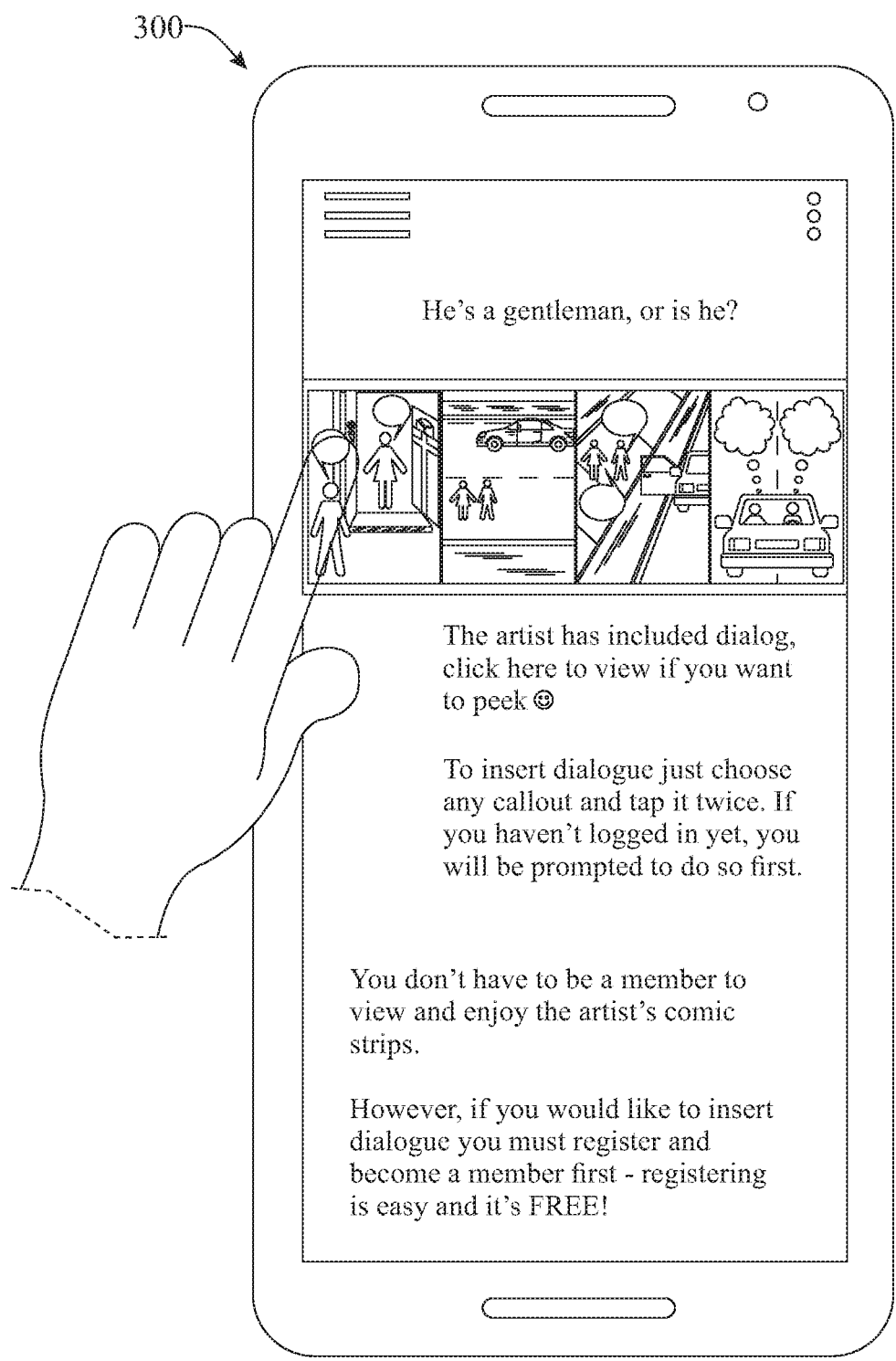
FIG. 5 illustrates a first editing screen of an exemplary user interface of a digital graphics uploading, dialoguing, and commenting system, in accordance with aspects of the present disclosure.
Figure 6:
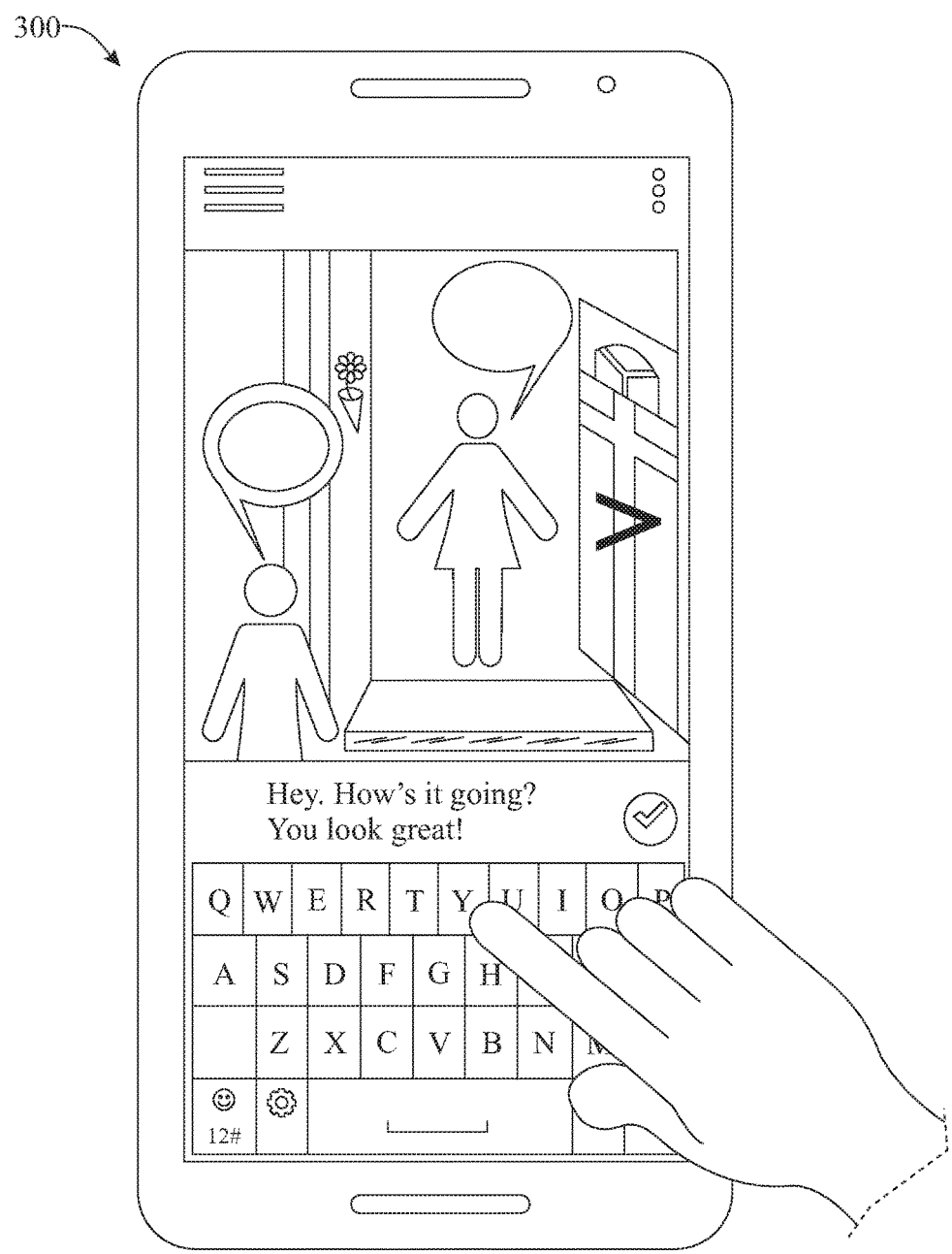
FIG. 6 illustrates a second editing screen of an exemplary user interface of a digital graphics uploading, dialoguing, and commenting system, in accordance with aspects of the present disclosure.

The illustrations of FIGS. 2-4 illustrate a splash screen and menus of a first embodiment of a digital graphics uploading, dialoguing, and commenting system. Once a user accesses the system proprietary software they may search through the system by performing a keyword search or by browsing through a branched menu system to find an appropriate digital media file. The user may then access the digital media file and may be granted certain privileges to that file based on their user type.

Figure 7:
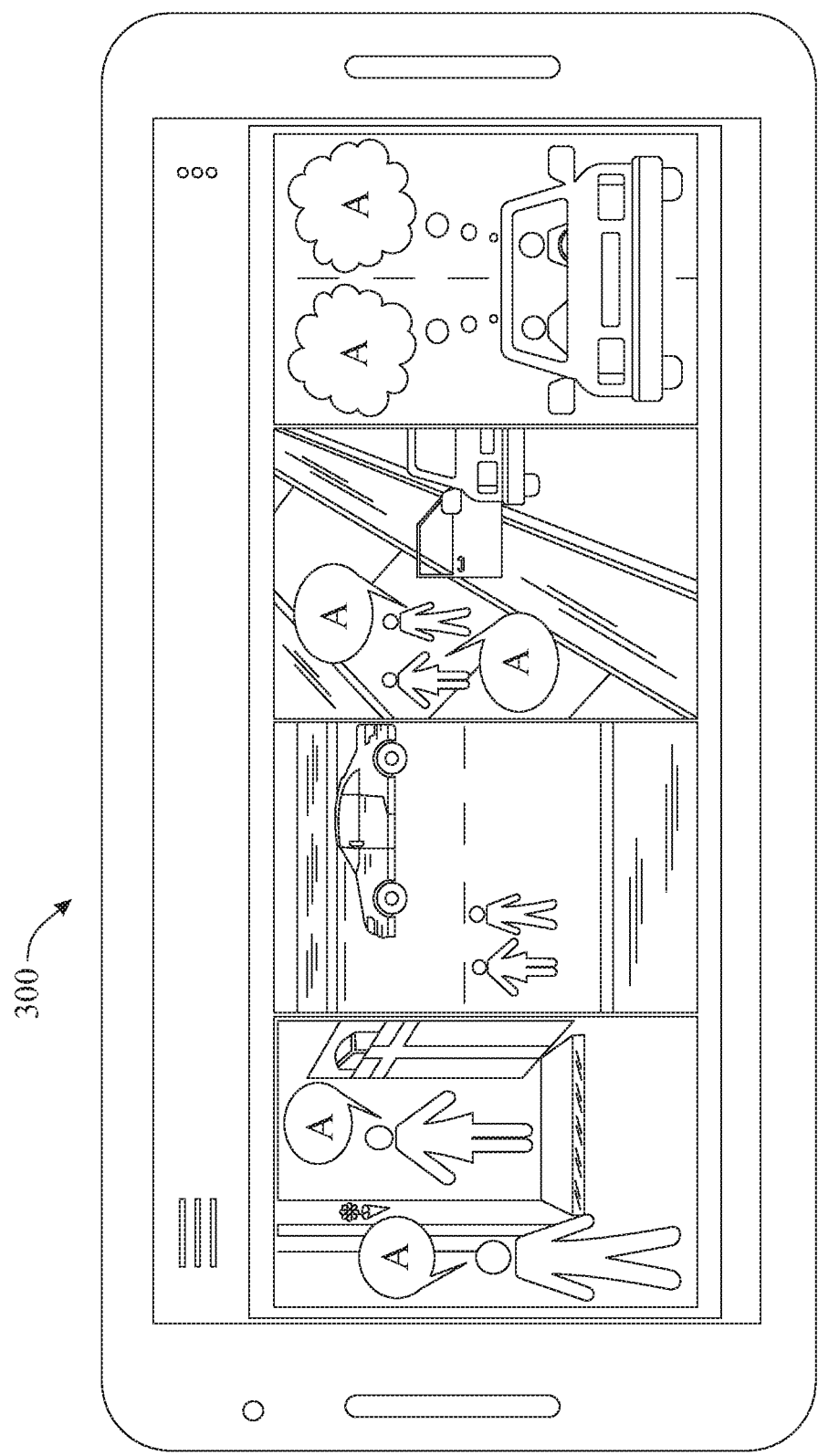
FIG. 7 illustrates a third editing screen of an exemplary user interface of a digital graphics uploading, dialoguing, and commenting system, in accordance with aspects of the present disclosure.
Figure 8:
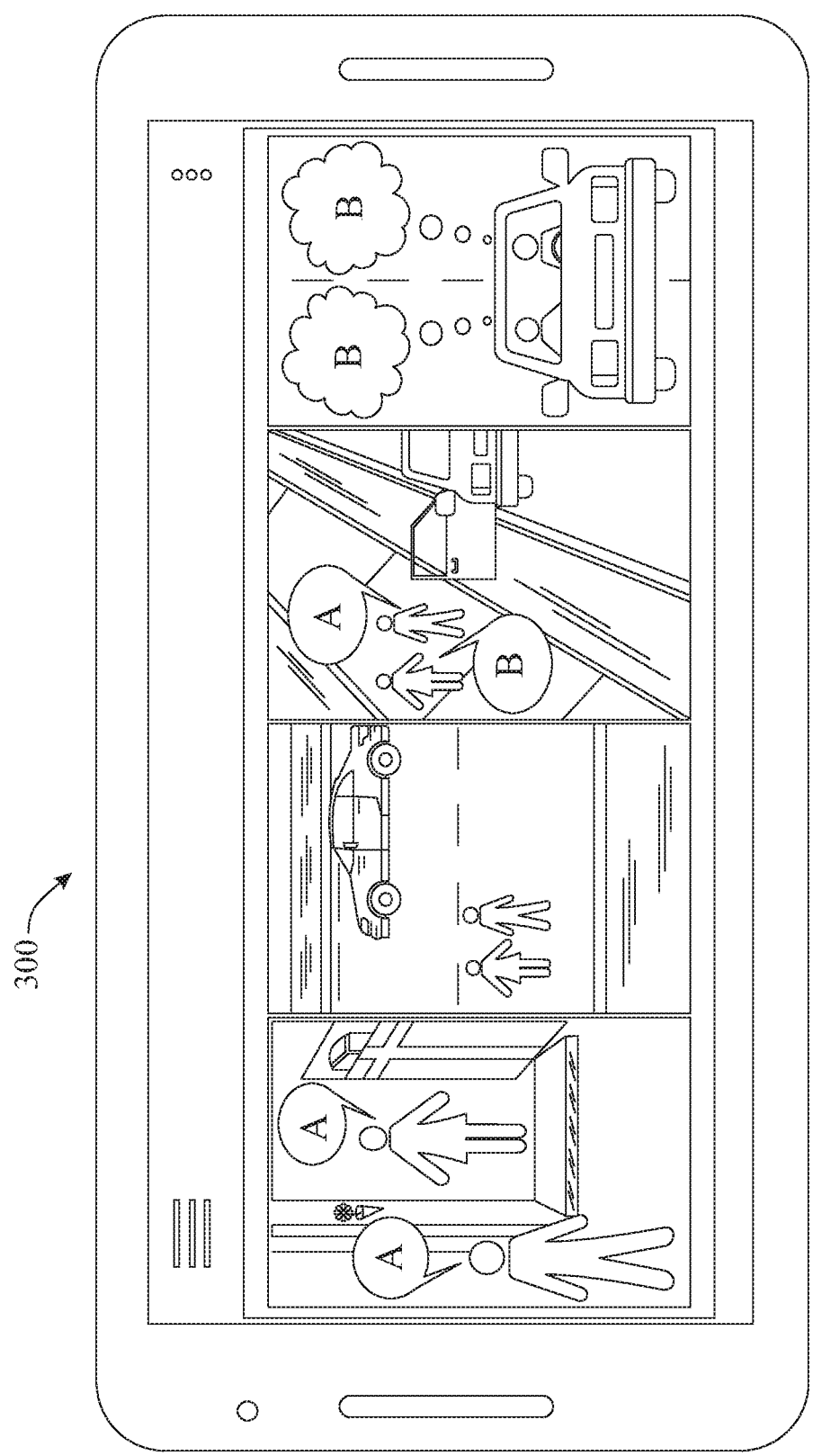
FIG. 8 illustrates a fourth editing screen of an exemplary user interface of a digital graphics uploading, dialoguing, and commenting system, in accordance with aspects of the present disclosure.

The illustrations of FIGS. 5-8 illustrate various editing screens of a first embodiment of a digital graphics uploading, dialoguing, and commenting system. A user accessing the digital media file may first be shown an overview of the file and its background information. The artist user 102, when creating the digital media file 104, may assign various callouts to the imagery of the file itself, which may be speech balloons or thought balloons into which another user may enter dialogue or text. The artist user 102 may assign their own dialogue or text to the various callouts, or may leave the callouts blank so that one or more editing users 112 may enter such text. For example, FIG. 7 shows callouts edited by a first user, represented by the letter "A". FIG. 8 shows that a second user has modified callouts labeled with letter "B". As such, callouts may be modified by a plurality of users to create uniquely collaborated stories.

Once an editing user 112 has selected a digital media file for editing they may select a callout and enter their chosen dialogue or text. The editing user 112 may continue to enter dialogue or text until all of the callouts in a digital media file have been filled, or may choose to only fill some of the callouts so that a second user may fill in the remainder. In this way an editing user 112 can create an entire story within the digital media file, or may collaborate with other users to create a story within the digital media file.

The digital graphics uploading, dialoguing, and commenting system may further comprise a privacy setting that may allow users to publish their digital media files only to a limited user set. The artist user 102 or editing user 112 may create a private group of users and may invite those users into the group such that published digital media files may only be viewed by that group of users. In this way artist users 102 and editing users 112 may conduct private viewings of their digital media.

In one embodiment, the digital graphics uploading, dialoguing, and commenting system may further comprise an electronic commerce (e-commerce) platform through which digital media files may be licensed, exchanged, or sold between users. A user of the system may associate a plurality of information with their user account, which may include payment and financial information such as, for example, credit card data, bank account data, electronic benefit transfer (EBT) data, and cryptocurrency data. In this way the system may act as a digital wallet for the user, allowing the user to access and transfer funds, as needed, with and between other users.

To protect the various user accounts, user data, and transactions it is contemplated that the proprietary software may implement modern data security and encryption protocols. By way of example, the proprietary software may implement the advanced encryption standard (AES), the triple data encryption standard (3DES), the twofish standard, the Rivest, Shamir, Adelman standard (RSA), or any other appropriate encryption protocol. It is contemplated that the proprietary software may implement, at least, 128-bit encryption, though more difficult encryption, such as, for example, 192-bit or 256-bit, may be implemented as desired. The proprietary software may further comprise online identity verification protocols to ensure a user is authorized to access the various financial accounts listed in their profile and to prevent fraudulent money transfers.

Figure 9:
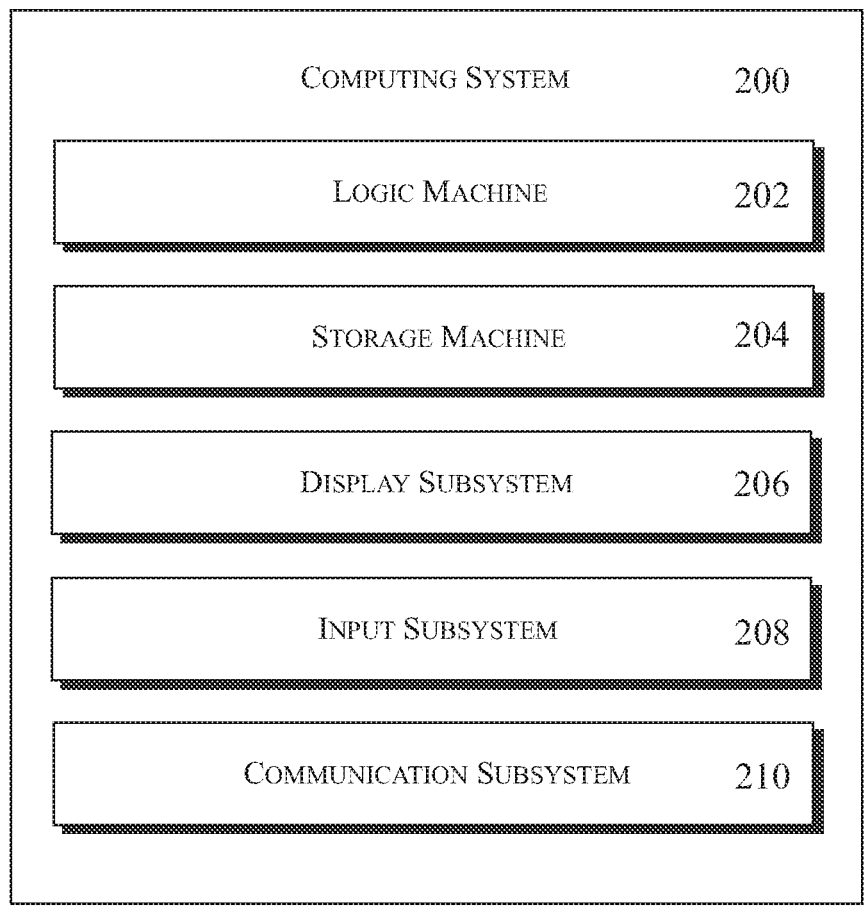
FIG. 9 schematically presents a computing system configured to carry out and actualize methods and tasks described herein, in accordance with aspects of the present disclosure.

The illustration of FIG. 9 schematically presents a computing system that may represent an embodiment of the present invention. In some embodiments the method or sub methods or tasks are automatically executed on a computing system such as computing system 200. For example, storage machine 204 may hold instructions executable by logic machine 202 to provide the method to users.

Display subsystem 206 may display the various elements of the method to participants. For example, display subsystem 206, storage machine 204, and logic machine 202 may be integrated such that the method may be executed while being displayed on a display screen. The input subsystem 208 may receive user input from participants to indicate the various choices or user inputs described above.

The described method may be executed, provided, or implemented to a user on one or more computing devices via a computer-program product such as via an application programming interface (API). Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210.

Logic machine 202 may execute machine-readable instructions via one or more physical devices. For example, the logic machine 202 may be configured to execute instructions to perform tasks for a computer program. The logic machine may include one or more processors to execute machine-readable instructions.

Storage machine 204 includes one or more physical devices configured to hold or store instructions executable by the logic machine to implement the method. When such methods and processes are implemented, the state of storage machine 204 may be changed to hold different data. For example, storage machine 204 may include memory devices such as various hard disk drives or CD or DVD devices.

Display subsystem 206 may visually present data stored on storage machine 204. For example, display subsystem 206 may visually present data to form a graphical user interface (GUI). Input subsystem 208 may be configured to connect and receive input from devices such as a mouse, keyboard, or gaming controller. The platform may also include a digital media file upload subsystem, a digital media file editing subsystem, and a digital media file searching subsystem. The digital media file upload subsystem allows a user to upload a digital image (i.e., a comic strip) to the platform. The digital media editing subsystem allows a user to edit a portion of the digital image that is editable. For example as described above, an editing user can use the editing subsystem to edit (i.e., add text) to the dialogue boxes (i.e., input, text boxes) on the digital image. The searching subsystem allows assigns at least one target identifier either at the request of the user or through natural machine language text recognition. Put differently, based on the text input added to the digital image the searching subsystem may assign certain markers (i.e., searchable parameters) to the image media file. In this manner, a user can search for a certain type of image or file. The platform may further include a communication subsystem 210 configured to enable system 200 to communicate with other computing devices. Communication subsystem 210 may include wired and/or wireless communication devices to facilitate networked communication.

Figure 10:
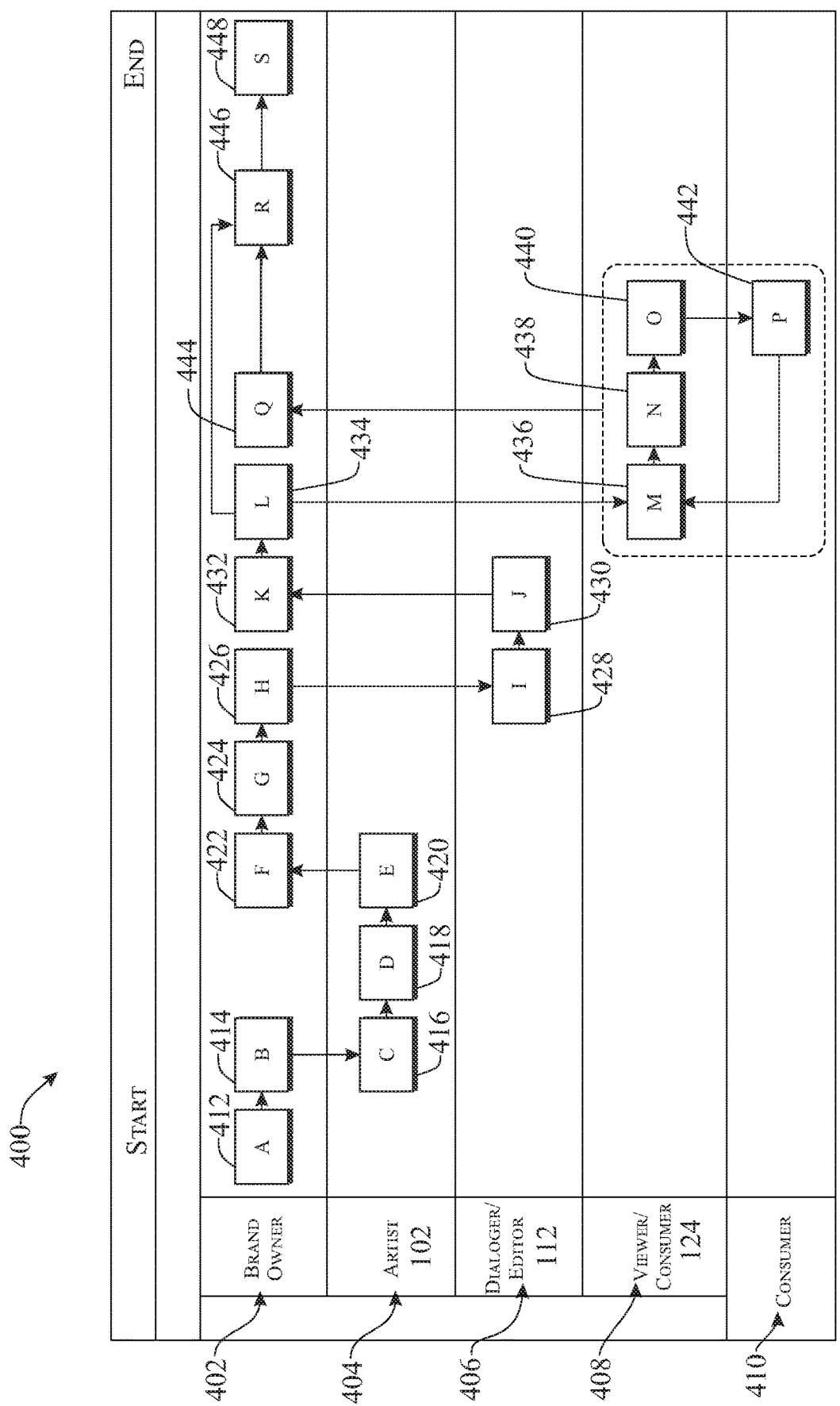
FIG. 10 illustrates a flow diagram 400 of a software governed compensation method with aspects of the present disclosure.

Referring now to FIG. 10, which provides a flow diagram 400 of how a user, whether it be an artist, editor, or viewer, may profit by subscribing or otherwise utilizing the present invention of a digital graphics uploading, dialoguing, and commenting system. In one exemplary embodiment, the flow diagram 400 illustrates at least five separate tiers that identify different sets of parties, and generally shows how each party in each respective tier may interact or associate with another party from a separate tier. For instance, the first tier 402 may include, in one exemplary form, any group of people who may be classified as business owners, brand owners, owners of commercial products, charitable organizations, private or public institutions, or the like. Tier two through four 404, 406, 408 may include the user types described herein above, such as an artist user 102, an editing user 112, and a viewer user 124. The fifth and final tier 410 may include people, who through the e-commerce system of the present invention, are in communication with some of the people described in the aforementioned tiers.

As will now be made clear, the following example will fully disclose a software governed compensation method that is new and non-obvious to a person skilled in the art. In one exemplary embodiment, a brand owner, who may go through the process of subscribing to the present system, may set up a profile, generally, through the steps outlined above. After the brand owner completes the profile step, the owner may decide to take the first action step 412 of allocating a budget for marketing or advertising. The first action step 412 may also include opening or posting a brand project or projects from a dashboard option offered by the present system. For example, the brand owner may create a project (i.e., a task) that requires a user to create some type of artwork that relates to the business the brand owner owns or operates. The brand owner may also upload document(s) providing project details to give other users a description of what the project entails and what it will be used for to advertise or promote. A document can also describe what the brand owner will offer in terms of compensation. An example of what a compensation document would describe could be, in one exemplary form, the brand owner's total budget of $1,000, and state that a portion of 70% would be offered to the artist user 102 who does the artwork, and a portion of 20% going to the editor user 112 who adds dialogue to the artwork, with the remaining 10% being absorbed by the operators of the platform as an admin fee. One will appreciate that the foregoing distribution of monetary funds for a project is exemplary and should not be considered limiting.

After the owner is settled on a project posting, the owner may take the next action step 414 of posting and soliciting artists to participate in the project. Artist users 102, who are associated and logged into the system, may take the action step 416 of selecting the desirable brand project. For instance, an artist user 102 may view a plurality of projects that are being offered by a plurality of brand owners and select at least one project the user 102 would like to work on. After selecting the project or projects, the artist user 102 takes the action step 418 of creating the artwork associated with the project that was posted by the brand owner. Once the artwork is complete, the user 102 takes the action step 420 of submitting the project (i.e., artwork) to the brand project owner that posted the project in step 412. The brand owner takes the action 422 of reviewing the project for approval. In the event the brand owner is not satisfied with the artwork and requires corrections, the brand owner may return the artwork to the artist user 102 for corrections or flat out reject the artwork. This back and forth between the brand owner and the artist users occur as many times as is needed until the brand owner is satisfied with a piece of artwork.

After the brand owner is satisfied with the project artwork, the brand owner takes the action steps 424, 426 of releasing and soliciting the artwork to editor (dialogue) users 112 to add diversified and subjective dialogue to the artwork. Similar to the process described above vis-à-vis artwork users 102 and the selection process of a project, editor users 112 who are associated and logged into the system, may take the action step 428 of reviewing projects that are ready to be edited. For instance, an editor user 112 may view a plurality of editable projects that are being offered by a plurality of brand owners and select at least one project the user 112 would like to work on. Following the selection of a project to edit, the editor user 112 takes the action 430 of adding dialogue to the artwork and submitting the finalized version to the brand owner for approval per action step 432. Unlike action step 422 where a brand owner may decide to return the artwork to the artist user 102 for corrections, the brand owner cannot return the dialogued artwork to the editor user 112 for any type of corrections because the editor is expressing his or her personal, diversified, ideas, and thoughts. Asking the editor user 112 to amend, change, or in any way alter the dialogue the user 112 added to the artwork would defeat, in-part, the purpose of the present invention that encourages self-expression. Of course, if the dialogued work includes unsavory language that is offense and unsolicited, the brand owner may reject the artwork.

Following the completion of the artwork and dialogue of the project, action 434 includes compensating 446 all of the parties involved, such as the artist user 102 and the editor user 112, in the project before, or just about when, the project is released to the user viewers 124 or consumers (i.e., pre-socialization). In one embodiment, compensation may be provided through the exchange of foreign or domestic currency or through crypto currency. The latter form of currency may be done through a transfer 448 from the brand owner to the accounts of the artist user 102 and the editor user 112 involved in the project.

Returning to action step 434, this action 434 also includes the brand owner releasing the completed project to a viewer 124 who is associated and logged into the system. The viewer user 124 may take the actions of viewing the completed project, supplying a comment or rating the project, and sharing the project with other viewers or consumers in alternative social networking platforms 436, 438, 440. Alternative social networking platforms include, but are not limited to, Facebook®, Instagram®, Snapchat®, WhatsApp®, Twitter®, TikTok®, or the like. Consumers receiving the project 442 may view the artwork and decide to become viewer users to also rate and comment on published projects. Any activity that results in revenues directly result from the project while it published by the viewers in the social networks are evaluated 444, and further compensation may be awarded to the users associated with the project (i.e., post-socialization). For example, brand owner may evaluate the social activity of the artwork through shares, clicks, comments, ratings or any other measurable metric, and compensate the artist and editor users based on the agreed upon terms of the project documents.

In summary, the present invention provides a digital platform that enables users to add dialogue to dialogue-free illustrations (e.g., comic strips), giving the opportunity of each respective user to express a subjective, personal, and likely diverse idea. The digital media content may be categorized, or tagged to facilitate the search of the digital media that is made available to a user in the central platform of the present invention. Indeed, users that prefer a particular type or a specific category, or categories of digital media will be able to parse through content with ease. The present invention may also support an e-commerce system that will allow communication and currency transactions between parties. Types of currency may include, but are not limited to, cryptocurrency (e.g., bitcoin), foreign currency (e.g., British pound) and domestic currency (e.g., United States dollar). For example, the present platform may allow a name brand to solicit artwork to advertise, promote, or market via a plurality of media platforms. In turn, users, such as artists and editors, as creators of new digital media may profit and receive compensation in the form of cryptocurrency for their labor.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A digital graphics uploading, dialoguing, and commenting system, comprising:
  a digital platform stored in a computer-readable storage media, a plurality of digital based subsystems in electrical communication with the computer-readable storage media, which when executed by one or more processors on one or more servers, causes the digital graphics uploading, dialoguing, and commenting system to:
  process user subscription inquiries from at least one person using at least one electronic device requesting access to the digital platform, when subscribing the person capable of choosing at least one user type from a plurality of user types supported by the digital platform to become a registered user;
  grant the registered user authorization to access at least one digital media subsystem from the plurality of digital based subsystems supported by the digital platform;
  present at least one digital image that is editable, viewable and searchable to a plurality of users subscribed to the digital platform, wherein the digital image is a string sequence of drawings editable, viewable, and searchable on an electronic device, and wherein only a portion of the digital image is editable, and the editable portion comprises at least one empty dialogue box configurable to receive a text-based input and the empty dialogue box is disposed on about at least one drawing of the sequence of drawings;

process input commands from the registered user using a digital based subsystem to edit the portion of the digital image to create a non-editable digital image;

initiate an identifiable marker subsystem that assigns at least one identifiable marker to the at least one digital image and the non-editable digital image;

present the non-editable digital image to a plurality of registered users subscribed to the digital platform, wherein the non-editable digital image is sharable to a plurality of users on third party platforms;

provide an e-commerce system configured to allow communication and currency transactions between registered users; and monitor a target data generator, the target data generator configured to gather data points based on interaction between the non-editable digital image and the plurality of users on the third party platforms, wherein the data points are generated through organic and non-organic exposure of the non-editable digital image.

2. The digital system of claim 1, wherein the plurality of user types include an artist type user, an editing type user, and a viewing type user.

3. The digital system of claim 1, wherein if the registered user is an artist type user, the registered user is capable of accessing the at least one digital based subsystem to either upload, edit, or search for the digital image.

4. The digital system of claim 1, wherein if the registered user is an editing type user, the registered user is capable of accessing the at least one digital based subsystem to edit and search for the digital image.

5. The digital system of claim 1, wherein if registered user is a viewing type user, the registered user is capable of accessing the at least one digital based subsystem to search for the non-editable digital image vis-à-vis the identifiable marker.

6. The digital system of claim 1, wherein the digital platform is downloadable to the electronic device, the electronic device comprising any one of a smart phone, tablet, wired and wireless computer.

7. The digital system of claim 1, wherein there is a correlation between the user type and the at least one digital media subsystem the registered user is given access to.

8. The digital system of claim 1, wherein the plurality of digital based subsystems include a digital media file upload subsystem, a digital media file editing subsystem, and a digital media file searching subsystem.

9. A digital graphics uploading, dialoguing, and commenting system, comprising:

a digital platform stored in a computer-readable storage media, a digital media file task subsystem, a digital media file upload subsystem, a digital media file editing subsystem, and a digital media searching subsystem in electrical communication with the computer-readable storage media, which when executed by one or more processors on one or more servers, causes the digital graphics uploading, dialoguing, and commenting system to:

process user subscription inquiries from a plurality of persons with each respective person using at least one electronic device to request access to the digital platform, when subscribing each one of the plurality of persons capable of choosing at least one user type from a plurality of user types supported by the digital platform to become registered users, wherein the plurality of user types comprise an owner type user, an artist type user, an editing type user, and a viewing type user;

process an input command from at least one owner type registered user, the owner type registered user using the digital media task subsystem to post on the digital platform at least one task selectively acceptable by at least one registered artist type registered user, wherein the task is to create a digital image based on a set of parameters;

wherein the owner type registered user assigns at least one identifiable marker to the task, making the task searchable by a plurality of registered users;

grant the at least one artist type registered user access to the digital media file uploading subsystem to upload the digital image, the digital image includes a portion that is editable by another user;

wherein the editable digital image comprises at least one toon comic strip, and wherein the editable portion of the at least one toon comic strip includes at least one empty dialogue box configurable to receive a text-based input, the empty dialogue box disposed about at least one drawing on the toon comic strip;

process an input command from the at least one owner type registered user, the owner type registered user using the digital media task subsystem to post on the digital platform at least one secondary task acceptable by at least one registered editing type registered user;

grant the at least one editing type registered user access to the digital media file editing subsystem to edit the editable portion of the toon comic strip and create a non-editable digital toon comic strip image;

initiate an identifiable marker system configurable to assign at least one identifiable marker to the at least one task, the at least one secondary task, the digital image, and the non-editable digital toon comic strip image;

present the non-editable digital toon comic strip image to the registered users subscribed to the digital platform and present the non-editable digital toon comic strip image to a plurality of users on third party platforms;

provide an e-commerce system configured to allow communication and currency transactions between registered users; and monitor a target data generator, the target data generator configured to gather data points based on interaction between the non-editable digital toon comic strip image and the plurality of users on the third party platforms, wherein the data points are generated through organic and non-organic exposure of the non-editable digital toon comic strip image.

10. The digital system of claim 9, wherein the at least one owner type registered user pre-compensates the at least one artist type registered user for completing the posted task, and pre-compensates the at least one editing type registered user for completing the secondary task.

11. The digital system of claim 9, wherein the at least one owner type registered user post-compensates the artist type registered user and the editing type registered user based on the data points gathered by the target data generator.

12. The digital system of claim 11, wherein the digital platform is downloadable to an electronic device.

* * * * *